United States Patent
Xiang et al.

(10) Patent No.: US 11,397,647 B2
(45) Date of Patent: Jul. 26, 2022

(54) HOT BACKUP SYSTEM, HOT BACKUP METHOD, AND COMPUTER DEVICE

(71) Applicant: BAIDU ONLINE NETWORK TECHNOLOGY (BEIJING) CO., LTD., Beijing (CN)

(72) Inventors: Bing Xiang, Beijing (CN); Xiaoliang Cong, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 392 days.

(21) Appl. No.: 16/553,557

(22) Filed: Aug. 28, 2019

(65) Prior Publication Data
US 2020/0073761 A1   Mar. 5, 2020

(30) Foreign Application Priority Data
Aug. 30, 2018  (CN) .......................... 201811002727.8

(51) Int. Cl.
*G06F 11/14*  (2006.01)
*G06F 11/07*  (2006.01)

(52) U.S. Cl.
CPC ...... *G06F 11/1464* (2013.01); *G06F 11/0751* (2013.01); *G06F 11/1448* (2013.01); *G06F 11/1469* (2013.01); *G06F 11/1471* (2013.01)

(58) Field of Classification Search
CPC ............ G06F 11/1464; G06F 11/0751; G06F 11/1448; G06F 11/1469; G06F 11/1471;
(Continued)

(56) References Cited

U.S. PATENT DOCUMENTS

| 5,239,640 A | * | 8/1993 | Froemke | ................. G06F 11/08 |
| | | | | 714/6.32 |
| 6,721,902 B1 | * | 4/2004 | Cochran | ............. G06F 11/1469 |
| | | | | 714/E11.122 |

(Continued)

FOREIGN PATENT DOCUMENTS

| CN | 101917263 A | 12/2010 |
| CN | 102158540 A | 8/2011 |

(Continued)

OTHER PUBLICATIONS

Chinese Patent Application No. 201811002727.8 First Office Action dated Jun. 12, 2020, 10 pages.

(Continued)

*Primary Examiner* — Ramon A. Mercado
(74) *Attorney, Agent, or Firm* — Lathrop GPM LLP

(57) ABSTRACT

Embodiments of the present disclosure provide a hot backup system, a hot backup method, and a computer device. The hot backup system includes a centralized management module, a master server, a slave server and a delay server. The master server is configured to receive a write instruction sent by the centralized management module, and write first data to a database of the master server based on the write instruction. The slave server is configured to perform data synchronization with the master server in real time, receive a read instruction sent by the centralized management module, and send second data read based on the read instruction to the centralized management module to cause the centralized management module to send the second data to the service server.

12 Claims, 2 Drawing Sheets

(58) Field of Classification Search
CPC ............ G06F 11/2025; G06F 11/2056; G06F 11/2097; G06F 11/1446; G06F 11/1466
See application file for complete search history.

(56) References Cited

U.S. PATENT DOCUMENTS

| | | | | |
|---|---|---|---|---|
| 8,112,661 | B1* | 2/2012 | La France | G06F 11/2069 714/42 |
| 9,798,629 | B1* | 10/2017 | Shilane | G06F 11/1466 |
| 2002/0188711 | A1* | 12/2002 | Meyer | G06F 11/2089 709/224 |
| 2004/0088382 | A1* | 5/2004 | Therrien | G06F 11/1464 709/219 |
| 2005/0010733 | A1* | 1/2005 | Mimatsu | G06F 11/1469 714/E11.122 |
| 2005/0081005 | A1* | 4/2005 | Keohane | G06F 3/0611 711/114 |
| 2009/0063795 | A1* | 3/2009 | Yueh | G06F 16/30 711/E12.001 |
| 2011/0191594 | A1* | 8/2011 | Bartlett | H04L 63/068 713/189 |
| 2012/0127855 | A1 | 5/2012 | Alon et al. | |
| 2016/0162371 | A1* | 6/2016 | Prabhu | G06F 3/065 707/654 |
| 2016/0162373 | A1* | 6/2016 | Damgar | G06F 11/1464 702/186 |
| 2017/0359853 | A1* | 12/2017 | Yang | G06F 16/25 |
| 2018/0307562 | A1* | 10/2018 | Xu | G06F 11/1448 |
| 2019/0095293 | A1* | 3/2019 | Zhang | G06F 11/1471 |
| 2021/0092158 | A1* | 3/2021 | Zhao | H04L 63/0876 |

FOREIGN PATENT DOCUMENTS

| | | |
|---|---|---|
| CN | 103970624 A | 8/2014 |
| CN | 106850255 A | 6/2017 |
| CN | 104158693 B | 4/2018 |
| CN | 108390781 A | 8/2018 |
| JP | 2004280528 A | 10/2004 |
| WO | WO 2010106991 A1 | 9/2010 |
| WO | WO 2017042890 A1 | 3/2017 |
| WO | WO 2018019023 A1 | 2/2018 |

OTHER PUBLICATIONS

Chinese Patent Application No. 201811002727.8 English translation of First Office Action dated Jun. 12, 2020, 12 pages.
European Patent Application No. 19194258.0 extended Search and Opinion dated Jan. 17, 2020, 6 pages.
Japanese Patent Application No. 2019-132717 Office Action dated Oct. 6, 2020, 4 pages.
Japanese Patent Application No. 2019-132717 English translation of Office Action dated Oct. 6, 2020, 4 pages.
MySQL Power Up Lecture Summary Replication of MySQL, SoftwareDesign 2008, 9 pages.
MySQL Introduction for DBA addressed to this case, DB Magazine, Dec. 1, 2004, 9 pages.
The designed pattern of a company cloud, the Nikkei Systems, Sep. 2015, 5 pages.

* cited by examiner

HOT BACKUP SYSTEM, HOT BACKUP METHOD, AND COMPUTER DEVICE

CROSS-REFERENCE TO RELATED APPLICATIONS

This application claims priority to and benefits of Chinese Patent Application No. 201811002727.8, filed with the National Intellectual Property Administration of P. R. China on Aug. 30, 2018, the entire contents of which are incorporated herein by reference.

TECHNICAL FIELD

The present disclosure relates to the field of computer technologies, and more particularly, to a hot backup system, a hot backup method, and a computer device.

BACKGROUND

A data communication system usually requires high reliability, such that the system can operate normally regardless of sudden failure or active maintenance. In order to improve reliability and maintainability of the system, disaster backup and recovery are necessary. For a system with a high reliability requirement, hot backup is the best backup solution.

However, hot backup technology in the related art has poor effect in addressing disaster recovery, misoperation, overload and other issues.

SUMMARY

Embodiments of a first aspect of the present disclosure provide a hot backup system. The hot backup system includes a centralized management module, a master server, a slave server and a delay server. The master server, the slave server and the delay server are coupled to the centralized management module, respectively. The centralized management module is configured to perform data transmission with a service server. The master server is configured to receive a write instruction sent by the centralized management module, in which the write instruction includes first data sent by the service server, and write the first data to a database of the master server based on the write instruction. The slave server is configured to perform data synchronization with the master server in real time, receive a read instruction sent by the centralized management module, and send second data read based on the read instruction to the centralized management module to cause the centralized management module to send the second data to the service server. The delay server is configured to perform delay backup on data operation information generated by the master server based on a preset delay backup parameter. The centralized management module is further configured to, in response to monitoring that the hot backup system is in an abnormal operating state, perform switching management on the master server, the slave server and the delay server based on the abnormal operating state.

Embodiments of a second aspect of the present disclosure provide a hot backup method executed by the hot backup system according to embodiments of the first aspect of the present disclosure. The method includes: obtaining first data sent by a service server; generating a write instruction for the first data, and writing the first data to a database of a master server based on the write instruction; controlling a slave server to perform data synchronization with the master server in real time; sending a read instruction to the slave server, receiving second data read by the slave server based on the read instruction, and sending the second data to the service server; controlling a delay server to perform delay backup on data operation information generated by the master server based on a preset delay backup parameter; and in response to monitoring that the hot backup system is in an abnormal operating state, performing switching management on the master server, the slave server and the delay server based on the abnormal operating state.

Embodiments of a third aspect of the present disclosure provide a computer device. The computer device includes a memory, a processor, and a computer program stored in the memory and executable by the processor. When the executable on the processor is executed by the processor, causes the hot backup method according to embodiments of the second aspect of the present disclosure to be implemented.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
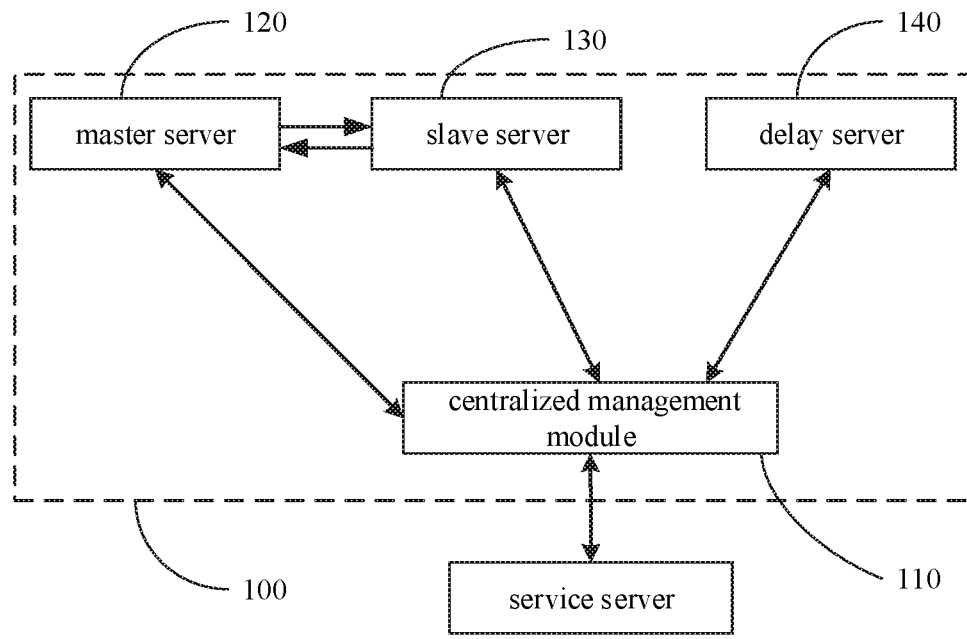
FIG. 1 is a schematic diagram of a hot backup system according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

A hot backup system, a hot backup method and a computer device according to embodiments of the present disclosure will be described below with reference to the accompanying drawings.

Currently, servers and databases on the market usually adopt the hot backup technology to solve disaster tolerance, fault tolerance and other situations, to avoid long-term service interruption, and ensure long-term and reliable service. For example, during operation of the system, two servers load the same system and data, and they are synchronized through a communication cable, where the currently operating server is the master server, and the other server is the standby server. The standby server continuously checks the status of the master server, and when it detects that the master server is abnormal, it performs identity switching.

FIG. 1 is a schematic diagram of a hot backup system according to an embodiment of the present disclosure. As shown in FIG. 1, the hot backup system 100 may include a centralized management module 110, a master server 120, a slave server 130, and a delay server 140. The master server 120, the slave server 130 and the delay server 140 are coupled to the centralized management module 110, respectively. In an embodiment of the present disclosure, the centralized management module 110 may be communicatively coupled to the master server 120, the slave server 130 and the delay server 140 via communication cables, respectively.

In an embodiment, the centralized management module 110 is configured to perform data transmission with the service server. For example, the centralized management module 110 may establish a communication link with the service server, and perform data transmission with the service server through the communication link. The centralized management module 110 may receive data to be stored sent by the service server, and send the data to be stored to a database of the master server 120 for storage. The centralized management module 110 may also read data from the database, and send the read data to the service server, to achieve data transmission with the service server.

In an embodiment of the present disclosure, the hot backup system 100 may include three servers, each having an identity, i.e., a master server, a slave server and a delay server.

The master 120 may be configured to receive a write instruction sent by the centralized management module 110, and write first data to a database of the master server 120 based on the write instruction, in which the write instruction includes the first data sent by the service server. For example, when the centralized management module 110 receives the first data sent by the service server, it may generate a write instruction for the first data, and send the write instruction to the master server 120. When the master server 120 receives the write instruction sent by the centralized management module 110, it may write the first data carried in the write instruction to the database of the master server 120 based on the write instruction, to achieve the function of writing the data to the database.

The slave server 130 is configured to perform data synchronization with the master server 120 in real time, and receive a read instruction sent by the centralized management module 110, and send second data read based on the read instruction to the centralized management module 110 to cause the centralized management module 110 to send the second data to the service server. For example, the slave server 130 may send a heartbeat packet to the master server 120 in real time to maintain the communication connection between them, and send a data synchronization request to the master server 120 in real time through the communication connection. When the master server 120 receives the data synchronization request, it may send the data stored in its database to the slave server 130 to achieve data synchronization.

In an embodiment of the present disclosure, the slave server 130 may have a read function, i.e., the slave server 130 may receive a read instruction sent by the centralized management module 110, and send the second data read based on the read instruction to the centralized management module 110. The centralized management module 110 may send the second data read from the slave server 130 to the service server for corresponding service data operation.

The delay server 140 may be configured to perform delay backup on data operation information generated by the master server 120 according to a preset delay backup parameter. In an embodiment of the present disclosure, the preset delay backup parameter may include delay time, such as 1 hour. For example, the delay server 140 may perform delay backup on the data operation information stored in the master server 120 according to the preset delay backup parameter. For example, the data currently stored in the master server 120 is data A, the delay server 140 may read the stored data A from the master server 120 after delaying 1 hour, and store and back up the data A to achieve the delay backup of the data in the master server. Thus, the data in the master server is backed up by the delay server, when the data transmission of the system fails, the data in the master server can be restored to the state before the delay time by the backup data in the delay server. For example, the data in the master server may be restored to the state one hour ago, thereby achieving rapid disaster recovery when the database is malfunctioning.

The centralized management module 110 may further be configured to, in response to monitoring that the hot backup system 100 is in an abnormal operating state, perform switching management on the master server 120, the slave server 130 and the delay server 140 based on the abnormal operating state. In at least one embodiment, when the centralized management module 110 monitors that the operating state of the hot backup system 100 is abnormal, it may determine a corresponding data abnormality level according to the abnormal operating state, and determine a fresh identity attribute for each of the master server 120, the slave server 130 and the delay server 140 according to the data abnormality level, and perform identity switching on the master server 120, the slave server 130 and the delay server 140 based on the fresh identity attribute.

For example, the centralized management module 110 may monitor the operating state of the hot backup system 100 in real time, when it monitors that the operating state of the hot backup system 100 is abnormal, it may determine a corresponding data abnormality level. In an embodiment, the data abnormality level may include a first level and a second level, the first level is less than the second level. For example, the first level may denote that the operating state of the master server is abnormal (for example, the master server cannot store data), the second level may denote that the operating states of the master server and the slave server are abnormal. After the corresponding data abnormality level is determined, the centralized management module 110 may determine the fresh identity attribute for each of the master server 120, the slave server 130 and the delay server 140 based on the data abnormality level, and perform identity switching on the master server 120, the slave server 130 and the delay server 140.

For example, when it is determined that the data abnormality level is the first level, i.e., the operating state of the master server is abnormal, the centralized management module 110 may take the slave server 130 as a fresh master server, restart the master server with the abnormal operating state and take it as a fresh slave server, and take the delay server 140 as a fresh delay server. For example, when it is determined that the data abnormality level is the second level, i.e., the operating states of the master server and the slave server are abnormal, the centralized management module 110 may take the delay server as a fresh master server, restart the master server with the abnormal operating state and take it as a fresh slave server, and restart the slave server with the abnormal operating state and take it as a fresh delay server. Thus, the database disaster recovery problem can be solved according to the data abnormality level, network or machine failure problem can be solved by the identity switching of the master sever and the slave server, and the database misoperation problem can be solved by the switching of the delay server.

In order to roll back the database to any point in time, in at least one embodiment, the master server 120 may adopt Binlog to back up the data in its database. In an embodiment of the present disclosure, the delay server 140 may obtain the data operation information from a Binlog log file of the master server 120 based on the preset delay backup parameter, and store the data operation information obtained. The delay backup parameter may include delay time.

For example, the master server 120 may adopt Binlog technology to back up the data in its database to generate a Binlog log file. The data operation information generated by the master server 120 may be recorded in the Binlog log file in a binary manner. The delay server 140 may obtain data operation information generated by the master server 120 in a preset time from the Binlog log file of the master server 120 after delaying the preset time, and store the data operation information obtained for backup. For example, taking the delay time of 1 hour as an example, the delay server 140 may read data operation information generated by the master server 120 in the past one hour from the Binlog log file of the master server 120 every hour, and store the read data operation information for backup. Thus, the data in the master server is backed up by Binlog, such that the database can be rolled back to any point in time by the Binlog log file based on a Binlog restore function.

In order to improve the reliability and availability of the system, in an embodiment of the present disclosure, the delay server 140 may also be configured to read backup data from the master server 120, perform statistics based on the backup data, and periodically check whether the backup data is available for incremental restore and rollback. In other words, the delay server 140 can read backup data from the master server 120, perform statistics (such as data statistics for business) on the backup data, and periodically check the backup data to verify whether the backup data can be used for incremental restoration and rollback, thereby preventing the master server from misusing illegal data for restoration, and ensuring data security.

Figure 2:
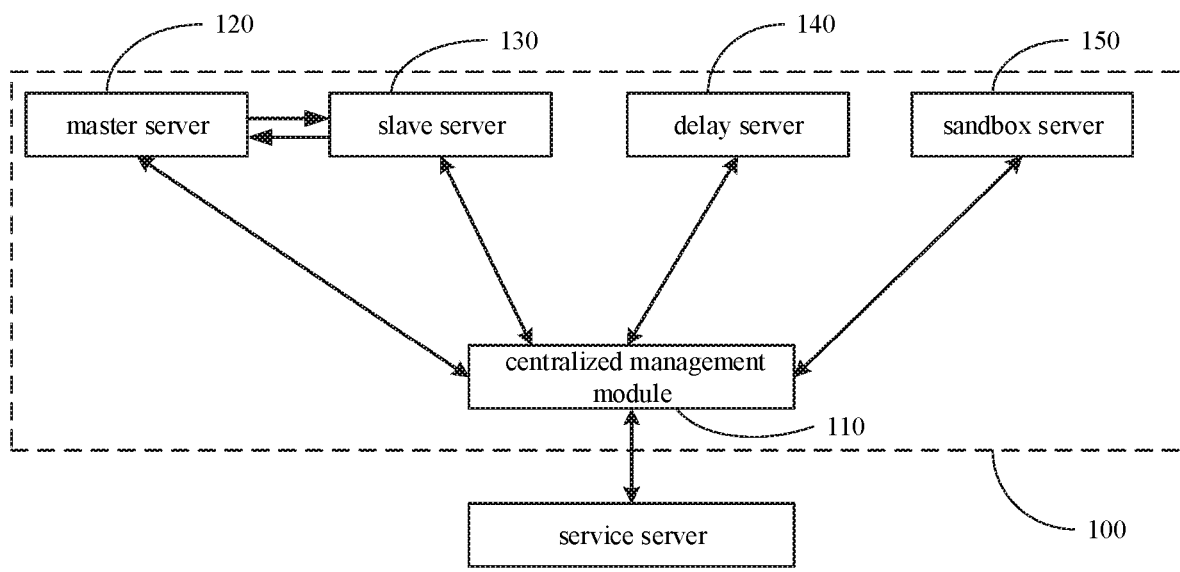
FIG. 2 is a schematic diagram of a hot backup system according to another embodiment of the present disclosure.

In order to improve the reliability of the system to achieve the hot backup based on four machine, in at least one embodiment, as shown in FIG. 2, FIG. 2 is a schematic diagram of a hot backup system according to another embodiment of the present disclosure, the hot backup system 100 may further include a sandbox server 150. The sandbox server 150 may be configured to perform periodic backup on the data operation information generated by the master server 120, and periodically check whether a full backup and restore function of the master server 120 is available. For example, the sandbox server 150 may back up the data operation information generated by the master server 120 once a day, and restore the backup data (i.e., restore the data to that of the previous day of the master server), and check the restoration result to verify whether the full backup and restore function of the master server 120 is available. For example, when the restored data is consistent with the full backup of the master server 120, it can be determined that the full backup and restore function of the master server 120 is available.

In at least one embodiment, the sandbox server 150 may also use the data periodically backed up from the master server 120 for operations such as pre-research, testing, real-world testing, etc., thereby utilizing and expanding the function of the sandbox server, and enriching the function of the system device.

In order to further improve the reliability of the system, and achieve better results in disaster recovery, misoperation, overload and other issues, the hot backup system of certain embodiments of the present disclosure may adopt four-machine hot backup technology.

When it is monitored that the hot backup system is in the abnormal operating state, the identities of the master server, the slave server, the delay server and the sandbox server may be switched based on the abnormal operating state. For example, when the centralized management module 110 monitors that the operating state of the hot backup system is abnormal, it may determine a corresponding data abnormality level, and determine a fresh identity attribute for each of the master server 120, the slave server 130, the delay server 140 and the sandbox server 150 based on the data abnormality level, and perform identity switching on the master server 120, the slave server 130, the delay server 140 and the sandbox server 150 based on the fresh identity attribute. The data abnormality level may include a first level, a second level and a third level, in which the first level is less than the second level, and the second level is less than the third level. For example, the first level may denote that the operating state of the master server is abnormal (for example, the master server cannot store data), the second level may denote that the operating states of the master server and the slave server are abnormal, and the third level may denote that the operating states of the master server, the slave server and the delay server are abnormal.

For example, when it is determined that the data abnormality level is the first level, i.e., the operating state of the master server is abnormal, the centralized management module 110 may take the slave server 130 as a fresh master server, restart the master server 120 with the abnormal operating state and take it as a fresh slave server, and take the delay server 140 as a fresh delay server, and take the sandbox server 150 as a fresh sandbox server. For example, when it is determined that the data abnormality level is the second level, i.e., the operating states of the master server and the slave server are abnormal, the centralized management module 110 may take the delay server 140 as a fresh master server, restart the master server 120 with the abnormal operating state and take it as a fresh slave server, and restart the slave server 130 with the abnormal operating state and take it as a fresh delay server, and take the sandbox server 150 as a fresh sandbox server.

For example, when it is determined that the data abnormality level is the third level, i.e., the operating states of the master server, the slave server and the delay server are abnormal, the centralized management module 110 may take the sandbox server 150 as a fresh master server, restart the master server 120 with the abnormal operating state and take it as a fresh slave server, restart the slave server 130 with the abnormal operating state and take it as a fresh delay server, and restart the delay server 140 with the abnormal operating state and take it as a fresh sandbox server. Thus, the database disaster recovery problem can be solved according to the data abnormality level, network or machine failure problem can be solved by the identity switching of the master sever and the slave server, and the database misoperation problem can be solved by the switching of the delay server.

With the hot backup system according to certain embodiments of the present disclosure, the master server can perform data transmission with the service server, and store the data sent by the service server, the slave server can synchronize data with the master server in real time, receive the read instruction sent by the centralized management module, and send second data read based on the read instruction to the centralized management module to cause the centralized management module to send the second data to the service server, so as to achieve data transmission with the service server, the centralized management module can perform switching management on the master server, the slave server and the delay server based on the abnormal operating state when it monitors that the hot backup system is in the abnormal operating state. Thus, based on the centralized management module, the disaster recovery problem can be solved according to the data abnormality level, by switching the identities of the master server and the slave server, the network or machine failure problem can be solved, and by the switching of the delay server, a database misoperation problem can be solved, such that better effect on disaster recovery, misoperation, overload and other issues can be achieved, and the reliability and maintainability of the system can be greatly improved.

Figure 3:
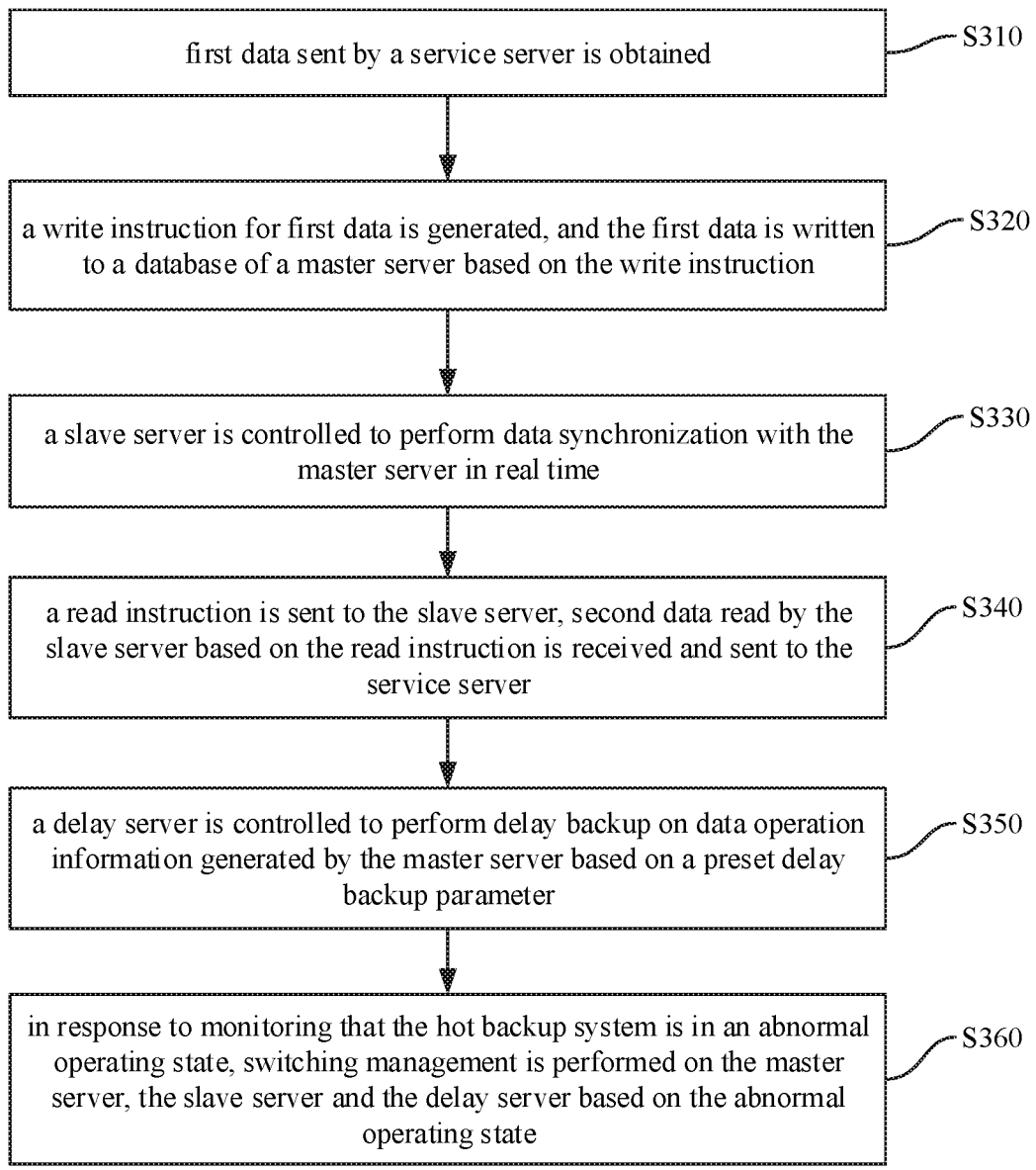
FIG. 3 is a flow chart of a hot backup method according to an embodiment of the present disclosure.

The present disclosure also provides a hot backup method. In an embodiment of the present disclosure, the hot backup method may be performed by the hot backup system according to any of the above embodiments of the present disclosure. FIG. 3 is a flow chart of a hot backup method according to an embodiment of the present disclosure. It should be noted that, the hot backup method in the embodiment may be described from the centralized management module side. As shown in FIG. 3, the hot backup method may include the following.

At block S310, first data sent by a service server is obtained.

In at least one embodiment, a communication link with the service server may be established, and the data transmission with the service server can be implemented through the communication link. For example, the first data sent by the service server may be received through the communication link.

At block S320, a write instruction for first data is generated, and the first data is written to a database of a master server based on the write instruction.

In at least one embodiment, when the first data sent by the service server is received, a write instruction may be generated for the first data, and the first data can be written to the database of the master server according to the write instruction.

At block S330, a slave server is controlled to perform data synchronization with the master server in real time.

For example, the slave server may be controlled to send a heartbeat packet to the master server in real time to maintain the communication connection between them, and to send a data synchronization request to the master server in real time through the communication connection. When the master server receives the data synchronization request, it may send the data stored in its database to the slave server 130 to achieve data synchronization.

At block S340, a read instruction is sent to the slave server, second data read by the slave server based on the read instruction is received and sent to the service server.

In at least one embodiment, the slave server may have a read function, i.e., the slave server may receive a read instruction sent by the centralized management module, and send the second data read based on the read instruction to the centralized management module. The centralized management module may send the second data read from the slave server to the service server for corresponding service data operation.

At block S350, a delay server is controlled to perform delay backup on data operation information generated by the master server based on a preset delay backup parameter.

In an embodiment of the present disclosure, the preset delay backup parameter includes delay time, such as 1 hour.

For example, the delay server may be controlled to perform delay backup on data operation information generated by the master server according to the preset delay backup parameter. For example, the data currently stored in the master server is data A, the delay server may be controlled to read the stored data A from the master server after delaying 1 hour, and to store and back up the data A to achieve the delay backup of the data in the master server. Thus, the data in the master server is backed up by the delay server, when the data transmission of the system fails, the data in the master server can be restored to the state before the delay time by the backup data in the delay server. For example, the data in the master server may be restored to the state one hour ago, thereby achieving rapid disaster recovery when the database is malfunctioning.

In order to roll back the database to any point in time, in at least one embodiment, the master server 120 may be controlled to adopt Binlog to back up the data in its database. In an embodiment of the present disclosure, the delay server may be controlled to perform delay backup on the data operation information generated by the master server based on the preset delay backup parameter by acts of: controlling the delay server to obtain the data operation information from a Binlog log file of the master server based on the preset delay backup parameter, and storing the data operation information obtained. The delay backup parameter may include delay time.

For example, the master server may be controlled to adopt Binlog technology to back up the data in its database to generate a Binlog log file. The data operation information generated by the master server may be recorded in the Binlog log file in a binary manner. The delay server may be controlled to obtain data operation information generated by the master server in a preset time from the Binlog log file of the master server after delaying the preset time, and to store the data operation information obtained for backup. For example, taking the delay time of 1 hour as an example, the delay server may be controlled to read data operation information generated by the master server in the past one hour from the Binlog log file of the master server every hour, and to store the read data operation information for backup. Thus, the data in the master server is backed up by Binlog, such that the database can be rolled back to any point in time by the Binlog log file based on a Binlog restore function.

At block S360, in response to monitoring that the hot backup system is in an abnormal operating state, switching management is performed on the master server, the slave server and the delay server based on the abnormal operating state.

In at least one embodiment, when it is monitored that the hot backup system is in the abnormal operating state, a data abnormality level may be determined according to the abnormal operating state, and fresh identity attributes for the master server, the slave server and the delay server can be determined based on the data abnormality level, and identity switching can be performed on the master server, the slave server and the delay server based on the fresh identity attributes.

For example, the operating state of the hot backup system may be monitored in real time, when it is monitored that the operating state of the hot backup system is abnormal, a corresponding data abnormality level can be determined. In an embodiment, the data abnormality level may include a first level and a second level, the first level is less than the second level. For example, the first level may denote that the operating state of the master server is abnormal (for example, the master server cannot store data), the second level may denote that the operating states of the master server and the slave server are abnormal. After the corresponding data abnormality level is determined, the fresh identity attributes for the master server, the slave server and the delay server may be determined based on the data abnormality level, and identity switching may be performed on the master server, the slave server and the delay server.

For example, when it is determined that the data abnormality level is the first level, i.e., the operating state of the master server is abnormal, the slave server may be taken as a fresh master server, the master server with the abnormal operating state may be restarted and taken as a fresh slave server, and the delay server may be taken as a fresh delay server. For example, when it is determined that the data abnormality level is the second level, i.e., the operating states of the master server and the slave server are abnormal, the delay server may be taken as a fresh master server, the master server with the abnormal operating state may be restarted and taken as a fresh slave server, and the master server with the abnormal operating state may be restarted and taken as a fresh delay server. Thus, the database disaster recovery problem can be solved according to the data abnormality level, network or machine failure problem can be solved by the identity switching of the master sever and the slave server, and the database misoperation problem can be solved by the switching of the delay server.

In order to improve the reliability and availability of the system, in an embodiment of the present disclosure, the delay server may be controlled to read backup data from the master server, to perform statistics based on the backup data, and to periodically check whether the backup data is available for incremental restore and rollback. In other words, the delay server may be controlled to read backup data from the master server, perform statistics (such as data statistics for business) on the backup data, and periodically check the backup data to verify whether the backup data can be used for incremental restoration and rollback, thereby preventing the master server from misusing illegal data for restoration, and ensuring data security.

In order to improve the reliability of the system to achieve the hot backup based on four machine, the hot backup system may further include a sandbox server. In at least one embodiment, the sandbox server may be controlled to perform periodic backup on the data operation information generated by the master server, and to periodically check whether a full backup and restore function of the master server is available. For example, the sandbox server may be controlled to back up the data operation information generated by the master server once a day, and restore the backup data (i.e., restore the data to that of the previous day of the master server), and check the restoration result to verify whether the full backup and restore function of the master server is available. For example, when the restored data is consistent with the full backup of the master server, it can be determined that the full backup and restore function of the master server is available.

In order to further improve the reliability of the system, and achieve better results in disaster recovery, misoperation, overload and other issues, the hot backup system of embodiments of the present disclosure may adopt four-machine hot backup technology.

When it is monitored that the hot backup system is in the abnormal operating state, the identities of the master server, the slave server, the delay server and the sandbox server may be switched based on the abnormal operating state. For example, when it is monitored that the operating state of the hot backup system is abnormal, a corresponding data abnormality level may be determined, and fresh identity attributes for the master server, the slave server, the delay server and the sandbox server may be determined, and identity switching may be performed on the master server, the slave server, the delay server and the sandbox server based on the fresh identity attributes. The data abnormality level may include a first level, a second level and a third level, in which the first level is less than the second level, and the second level is less than the third level. For example, the first level may denote that the operating state of the master server is abnormal (for example, the master server cannot store data), the second level may denote that the operating states of the master server and the slave server are abnormal, and the third level may denote that the operating states of the master server, the slave server and the delay server are abnormal.

For example, when it is determined that the data abnormality level is the first level, i.e., the operating state of the master server is abnormal, the slave server may be taken as a fresh master server, the master server with the abnormal operating state may restarted and taken as a fresh slave server, the delay server may be taken as a fresh delay server, and the sandbox server may be taken as a fresh sandbox server. For example, when it is determined that the data abnormality level is the second level, i.e., the operating states of the master server and the slave server are abnormal, the delay server may be taken as a fresh master server, the master server with the abnormal operating state may be restarted and taken as a fresh slave server, the slave server with the abnormal operating state may be restarted and taken as a fresh delay server, and the sandbox server may be taken as a fresh sandbox server.

For example, when it is determined that the data abnormality level is the third level, i.e., the operating states of the master server, the slave server and the delay server are abnormal, the sandbox server may be taken as a fresh master server, the master server with the abnormal operating state may be restarted and taken as a fresh slave server, the slave server with the abnormal operating state may be restarted and taken as a fresh delay server, and the delay server with the abnormal operating state may be restarted and taken as a fresh sandbox server. Thus, the database disaster recovery problem can be solved according to the data abnormality level, network or machine failure problem can be solved by the identity switching of the master sever and the slave server, and the database misoperation problem can be solved by the switching of the delay server.

With the hot backup method according to embodiments of the present disclosure, the master server can perform data transmission with the service server, and store the data sent by the service server, the slave server can synchronize data with the master server in real time, receive the read instruction sent by the centralized management module, and send second data read based on the read instruction to the centralized management module to cause the centralized management module to send the second data to the service server, so as to achieve data transmission with the service server, the centralized management module can perform switching management on the master server, the slave server and the delay server based on the abnormal operating state when it monitors that the hot backup system is in the abnormal operating state. Thus, based on the centralized management module, the disaster recovery problem can be solved according to the data abnormality level, by switching the identities of the master server and the slave server, the network or machine failure problem can be solved, and by the switching of the delay server, a database misoperation problem can be solved, such that better effect on disaster recovery, misoperation, overload and other issues can be achieved, and the reliability and maintainability of the system can be greatly improved.

In order to implement the above embodiments, the present disclosure provides a computer device.

Figure 4:
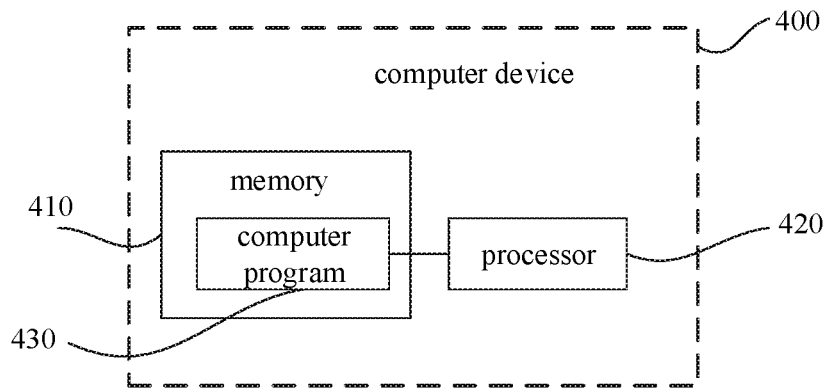
FIG. 4 is a block diagram of a computer device according to an embodiment of the present disclosure.

FIG. 4 is a block diagram of a computer device according to an embodiment of the present disclosure. As shown in FIG. 4, the computer device 400 may include a memory 410, a processor 420, and a computer program 430 stored in the memory 410 and executable by the processor 420. When the processor 420 executes the program 430, causes the hot backup method according to any of the above embodiments to be implemented.

In descriptions of the present disclosure, it should be understood that, terms such as "first" and "second" are used herein for purposes of description and are not intended to indicate or imply relative importance or significance or to imply the number of indicated technical features. Thus, the feature defined with "first" and "second" may explicitly or implicitly includes one or more of this feature. In the description of the present disclosure, "a plurality of" means two or more than two, unless specified otherwise.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Any procedure or method described in the flow charts or described in any other way herein may be understood to include one or more modules, portions or parts for storing executable codes that realize particular logic functions or procedures. Moreover, advantageous embodiments of the present disclosure include other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that, all or parts of the steps in the above exemplifying method of the present disclosure may be achieved by instructing the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A hot backup system, comprising: a centralized management module, a master server, a slave server, a delay server and a sandbox server, wherein,
   the master server, the slave server, the delay server and the sandbox server are coupled to the centralized management module, respectively, and the master server and the slave server are communicatively connected to perform data synchronization in real time;
   the centralized management module is configured to perform data transmission with a service server;

the master server is configured to receive a write instruction sent by the centralized management module, the write instruction comprising first data sent by the service server, and write the first data to a database of the master server based on the write instruction;

the slave server is configured to receive a read instruction sent by the centralized management module, and send second data read based on the read instruction to the centralized management module to cause the centralized management module to send the second data to the service server;

the delay server is configured to perform delay backup on data operation information generated by the master server based on a preset delay backup parameter;

the centralized management module is further configured to, in response to monitoring that the hot backup system is in an abnormal operating state, perform switching management on the master server, the slave server and the delay server based on the abnormal operating state, the sandbox server is configured to perform periodic backup on the data operation information generated by the master server, and periodically check whether a full backup and restore function of the master server is available.

2. The hot backup system according to claim 1, wherein, the master server is further configured to perform data backup on the database of the master server by using Binlog;

the delay server is configured to obtain the data operation information from a Binlog log file of the master server based on the preset delay backup parameter, and store the data operation information obtained, the delay backup parameter comprising delay time.

3. The hot backup system according to claim 1, wherein the delay server is further configured to:

read backup data from the master server, perform statistics based on the backup data, and periodically check whether the backup data is available for incremental restore and rollback.

4. The hot backup system according to claim 1, wherein the centralized management module is configured to:

determine a data abnormality level based on the abnormal operating state;

determine a fresh identity attribute for each of the master server, the slave server, the delay server and the sandbox server based on the data abnormality level; and perform identity switching on the master server, the slave server, the delay server and the sandbox server based on the fresh identity attribute.

5. A hot backup method, comprising:

obtaining first data sent by a service server;

generating a write instruction for the first data, and writing the first data to a database of a master server based on the write instruction;

controlling a slave server to perform data synchronization with the master server in real time;

sending a read instruction to the slave server, receiving second data read by the slave server based on the read instruction, and sending the second data to the service server;

controlling a delay server to perform delay backup on data operation information generated by the master server based on a preset delay backup parameter; and in response to monitoring that the hot backup system is in an abnormal operating state, performing switching management on the master server, the slave server and the delay server based on the abnormal operating state, controlling a sandbox server to perform periodic backup on the data operation information generated by the master server, and to periodically check whether a full backup and restore function of the master server is available.

6. The hot backup method according to claim 5, wherein, the hot backup method further comprises: controlling the master server to perform data backup on the database of the master server by using Binlog;

wherein controlling the delay server to perform delay backup on the data operation information generated by the master server based on the preset delay backup parameter comprises:

controlling the delay server to obtain the data operation information from a Binlog log file of the master server based on the preset delay backup parameter, and to store the data operation information obtained, the delay backup parameter comprising delay time.

7. The hot backup method according to claim 5, further comprising:

controlling the delay server to read backup data from the master server, to perform statistics based on the backup data, and to periodically check whether the backup data is available for incremental restore and rollback.

8. The hot backup method according to claim 5, wherein performing the switching management on the master server, the slave server and the delay server based on the abnormal operating state comprises:

determining a data abnormality level based on the abnormal operating state;

determining a fresh identity attribute for each of the master server, the slave server, the delay server and the sandbox server based on the data abnormality level; and performing identity switching on the master server, the slave server, the delay server and the sandbox server based on the fresh identity attribute.

9. A computer device, comprising:

a memory;

a processor; and a computer program stored in the memory and executable by the processor, wherein the computer program, when executed by the processor, causes a hot backup method to be implemented, the hot backup method comprising:

obtaining first data sent by a service server;

generating a write instruction for the first data, and writing the first data to a database of a master server based on the write instruction;

controlling a slave server to perform data synchronization with the master server in real time;

sending a read instruction to the slave server, receiving second data read by the slave server based on the read instruction, and sending the second data to the service server;

controlling a delay server to perform delay backup on data operation information generated by the master server based on a preset delay backup parameter; and in response to monitoring that the hot backup system is in an abnormal operating state, performing switching management on the master server, the slave server and the delay server based on the abnormal operating state, controlling a sandbox server to perform periodic backup on the data operation information generated by the master server, and to periodically check whether a full backup and restore function of the master server is available.

10. The computer device according to claim 9, wherein,
the hot backup method further comprises: controlling the
  master server to perform data backup on the database of
  the master server by using Binlog;
wherein controlling the delay server to perform delay
  backup on the data operation information generated by
  the master server based on the preset delay backup
  parameter comprises:
controlling the delay server to obtain the data operation
  information from a Binlog log file of the master server
  based on the preset delay backup parameter, and to
  store the data operation information obtained, the delay
  backup parameter comprising delay time.

11. The computer device according to claim 9, wherein
the hot backup method further comprises:
  controlling the delay server to read backup data from the
    master server, to perform statistics based on the backup
    data, and to periodically check whether the backup data
    is available for incremental restore and rollback.

12. The computer device according to claim 9, wherein
performing the switching management on the master server,
the slave server and the delay server based on the abnormal
operating state comprises:
  determining a data abnormality level based on the abnormal operating state;
  determining a fresh identity attribute for each of the
    master server, the slave server, the delay server and the
    sandbox server based on the data abnormality level;
    and
  performing identity switching on the master server, the
    slave server, the delay server and the sandbox server
    based on the fresh identity attribute.

\* \* \* \* \*